United States Patent [19]

Heuer et al.

[11] Patent Number: 5,498,646

[45] Date of Patent: Mar. 12, 1996

[54] PRODUCTION OF BLOCK POLYMER ADHESIVES

[75] Inventors: Glenn C. Heuer, Forest Lake; George F. Bateson, Fridley, both of Minn.

[73] Assignee: H. B. Fuller Licensing & Financing, Inc., Arden Hills, Minn.

[21] Appl. No.: 301,905

[22] Filed: Sep. 6, 1994

Related U.S. Application Data

[63] Continuation-in-part of Ser. No. 996,830, Dec. 23, 1992, Pat. No. 5,403,874.

[51] Int. Cl.⁶ .................................................. C08J 3/205
[52] U.S. Cl. .................... 523/344; 523/324; 523/346; 523/348; 524/505; 524/534
[58] Field of Search ................................ 523/324, 344, 523/346, 348; 524/505, 534

[56] References Cited

U.S. PATENT DOCUMENTS

| | | | |
|---|---|---|---|
| 3,639,521 | 2/1972 | Hsieh | 529/98 |
| 4,526,577 | 7/1985 | Schmidt, Jr. et al. | 604/366 |
| 4,822,653 | 4/1989 | Kauffman et al. | 524/505 X |
| 5,024,667 | 6/1991 | Malcolm et al. | 604/382 |
| 5,037,411 | 8/1991 | Malcolm et al. | 604/358 |

FOREIGN PATENT DOCUMENTS

| | | |
|---|---|---|
| 4020458A1 | 1/1992 | Germany . |
| 149234 | 12/1978 | Japan ................... 523/348 |

OTHER PUBLICATIONS

"High Efficiency Dispersing Machines for Continuous Processing" from DISPAX–REACTOR publication of IDA Maschinenbau.

*Primary Examiner*—Judy M. Reddick
*Attorney, Agent, or Firm*—Vidas, Arrett & Steinkraus

[57] ABSTRACT

Method for preparing adhesive compositions subjecting a mixture of block polymer and other adhesive constituents e.g., resin(s) and oil(s) to shearing and smearing in an emulsifier disperser.

13 Claims, 2 Drawing Sheets

PRODUCTION OF BLOCK POLYMER ADHESIVES

CROSS-REFERENCE TO RELATED APPLICATION

This application is a continuation-in-part of application Ser. No. 07/996,830, filed Dec. 23, 1992 the disclosure of which is hereby incorporated by reference.

BACKGROUND OF THE INVENTION

1. Field of the Invention

This invention relates to the production of adhesives containing block polymers and more particularly to block polymer pressure sensitive adhesives (PSA) of various compositions. Many such adhesive compositions and specifically PSA compositions are well known in the art. More particularly, the invention relates to an improved method for the production of these adhesives.

2. Description of the Related Art

Since this invention is of more importance presently to PSA's, the following descriptions will refer primarily to such adhesive compositions for purposes of exemplifications of the method of the invention.

Pressure sensitive adhesives (PSA) and other adhesive compositions making use of block copolymers include both linear and radial types. Generally, such block copolymers may be represented schematically as:

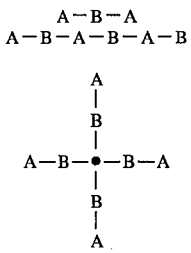

wherein A blocks may comprise for example, polymerized vinyl-substituted aromatic monomers and the B may blocks may comprise for example, polymerized dienes having 4–12 carbon atoms or other elastomeric or rubbery polymeric component(s). In the radial polymers a polyfunctional coupling agent is included and these are well known, for example, see U.S. Pat. No. 3,639,521. In the case of PSA's, the A blocks preferably comprise polymerized styrene and the B blocks preferably comprise polymerized butadiene isoprene, or mixtures thereof or hydrogenated versions thereof. Such copolymers typically have a molecular weight in the range of about 70,000–140,000 and have about 12 to 35 wt-% styrene. Such block copolymers are available from Shell Chemical Company, Enichem, Fina and Firestone and others. A common block polymer of this type is KRATON 1102, available from Shell and is referred to herein by way of exemplification of the invention.

In addition to the block polymer constituent(s), PSA compositions will include tackifying resin(s), plasticizing oils and sometimes other optional ingredients, as is well known in the PSA art. Other block polymer adhesive compositions may include waxes, non-tacky resins and so forth.

A wide variety of PSA compositions are known and used in the art as evidenced for example by U.S. Pat. No. 5,024,667 and U.S. Pat. No. 5,037,411 all compositions of which may be produced by the method of this invention.

Likewise, a wide variety of tackifiers are known as are wide varieties of the plasticizer oils. For example, typical tackifying resins include rosin, tall oil, rosin ester resins, natural and synthetic terpenes and various aromatics. Plasticizer oils are primarily hydrocarbon oils, typically paraffinic or naphthenic in character. However, other plasticizers may be used.

Most preferred for use herein, when PSA compositions are involved, are the block copolymers wherein the A block or non-elastomeric block is styrene and the elastomeric or B block is butadiene. Typically the latter is present at levels of about 50 to 80 wt% although this will vary and is not critical. The method maybe practiced with any PSA compositions and any other block polymer adhesive compositions. Block polymers of this specific type and composition are commercially available from Shell Chemical Company under the tradename KRATON 1102 (about 70 parts butadiene and 30 parts styrene) among others. Other manufacturers of block polymers for adhesives are well known. Blends of these high molecular weight copolymers with compatible low molecular weight block copolymers may also be employed. All such foregoing polymeric compositions are referred to herein as "block polymer(s)" in general and collectively.

The traditional method of preparing block polymer adhesives is to add resin and oil to a jacketed tank equipped with a standard vertical agitator. This mixture is heated to about 300° F. and beads of block polymer are added. The temperature is maintained between about 300° to 350° F. with continued agitation. The adhesive is complete when the block polymer is completely blended into the resin/oil mixture. The time required for complete blending is usually 6 hours to 24 hours, depending on the degree of agitation. Block polymer beads disperse very slowly without a shearing and smearing action. Such long times at temperature can cause degradation of the polymer.

The commonly preferred and commercially practiced prior art method for producing block polymer PSA compositions involves the working in shear of the block polymer. This is usually initiated by adding preformed commercially available beads of the selected polymer composition to conventional thermoplastic polymer processing equipment capable of providing sufficiently high shear to blend the polymer by working it to a taffy-like melt. Small amounts of tackifier resin and oil may be added initially to facilitate the working. The block polymer is typically available commercially in a bead-like form and a variety of compositions for this purpose are available from many sources.

In the prior art, after working the polymer, (typically 30 minutes - 2 hours or so), to achieve the taffy-like melt condition the main additive amounts of resin, oil and/or any other ingredients are added. The resin is preferably heated prior to being added to the melt. The resultant liquid composition is passed from the processing equipment to a holding tank or the like and then to the final container such as a drum, pillow box, or the like in which it is ultimately sold, where it is allowed to cool and solidify.

The processing equipment used for this purpose is extremely expensive in excess of hundreds of thousands of dollars, and is very high power consumptive in operation. Typically it includes such equipment as screw extruders, Mixtruders, Sigma Blademixers or the like.

More detailed information on presently practiced production methods for PSA is described in the following articles:

The article "Machinery and Equipment" of *Plastics Compounding Redbook* or 1987/88, is a compilation of information regarding compounding and size reduction equipment including lab and production scale blending apparatus. The articles "Liquid Resin Injection System for Continuous Mixing of HMPSA" and "Extruder Performance Over Broad Meld Index Ranges" discuss blending materials having different viscosity profiles.

The article "Advance in Production and Coating Technology for Hot Melt Pressure Sensitive Adhesives-Multiruder System" discusses the multiruder system of premixer, multiruder and coater and is used for continuous production and coating of hot melt pressure sensitive adhesives for labels and tapes.

The article "Continuous Compounding of Hot Melt Adhesives" discusses continuously operating blending systems capable of blending hot melt adhesives with reduced heat history. Such compounding systems involve extrusion processing.

The article "Technical Aspects for Extrusion Compounding of Hot Melt Adhesives" discusses continuous processing systems for the manufacture of hot melt and pressure sensitive adhesive formulations using batch and twin screw manufacturing methods.

The article "Twin Screw Extruder Process of Adhesive" discusses continuous processing hot melt adhesive compounding with block polymer formulations using multi-stage feeding of oil resins, additives and base polymer.

The article "Continuous Production of Hot Melt Adhesives Aspects of Quality and Costing" discusses basic processing possibilities for producing hot melts continuously involving working from a premix and deals with four basic continuous processes. The disclosure involves multi-stage addition, pelletizing, coating, etc. Equipment for such manufacture is shown in the brochures of Welding Engineers, Inc., Eagan Manufacturing Company, Buss-Kneader, Warner and Pfleiderer, Conair and Black Clausen.

In accordance with this invention a new and improved method of preparing adhesive compositions is provided. The new method minimizes the cost of process equipment and minimizes heat degradation of the block polymer. Most importantly the process time involving the polymer is a matter of an hour or even merely minutes rather than hours. This is important with respect to reducing the heat and shear to which the polymer is subjected. Additionally, the method consumes less electrical energy and utilizes lower horsepower motors than the prior art.

SUMMARY OF THE INVENTION

To produce adhesives according to this invention, one charges the constituents to a mixing vessel. All or some of these constituents may be used initially. The sequence of mixing these constituents is not critical and may vary. This mixture is then mechanically emulsified or dispersed to shear and smear the polymer over a relatively short time interval. Preferably, a melt is prepared and the block polymer, in a particulate form preferably, is added to the melt and held for a period of time to allow for softening of the polymer. Preferably the melt is mixed or agitated at this time.

Most preferably, to produce PSA compositions according to the invention, one charges the oil and resin additives to a vessel in which mixing may be accomplished. The charge mixture is heated to a suitable temperature, such as about 220°–300° F., then the block polymer, in bead form preferably or any other particulate form, is added to the heated charge mixture of resin/oil and the polymer particles are mixed therewith for a few minutes to soften them and insure that the charge is substantially uniform.

The resultant hot mixture with softened polymer is then pumped, preferably hot, through an emulsifier or dispersing machine to shear and smear the softened polymer particles and further mix them into the resin/oil. Such apparatus, referred to herein sometimes as emulsifier/disperser, generates high shear, cutting and intensive mixing of the mixture at high speeds. The overall mixture is only present in the dispersing device for a matter of minutes. The method may be practiced on a batch basis or on a continuous basis.

BRIEF DESCRIPTION OF THE DRAWINGS

A detailed description of the invention is hereafter described with specific reference being made to the drawings in which.

DETAILED DESCRIPTION OF THE PREFERRED EMBODIMENTS

As already indicated, it is a primary aim of this invention, among other things, to reduce the process time significantly in the production of block polymer adhesives, particularly PSA's, and to reduce cost. It is also an object to reduce temperature degradation of the polymer. This is accomplished in the following preferred manner.

Figure 1:
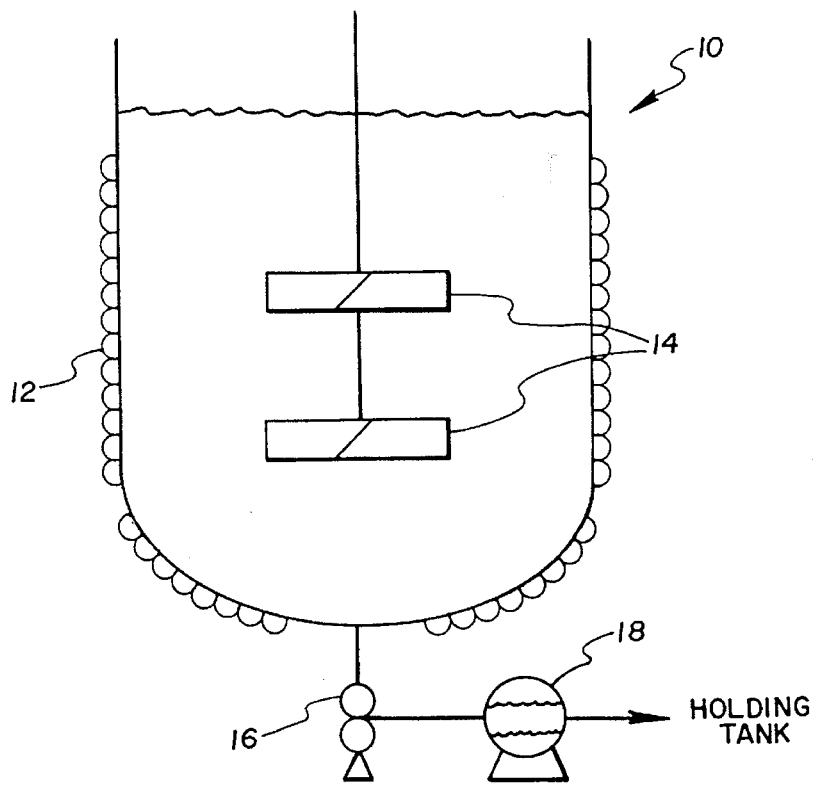
FIG. 1 is a schematic showing of the processing equipment used in a batch form of the subject method (external emulsifier).

Referring to FIG. 1, an arrangement for practicing the method with an "external emulsifier" is shown as including a mixing vessel such as a holding tank, ribbon blender or the like, generally indicated at 10. It is fitted with means for heating the contents thereof such as a steam jacket or hot oil jacket 12 and a mixer or agitation means such as blades 14 as are found in standard vertical mixers. A wide variety of known equipment may be used for tank 10 and elements 12 and 14, it only being important that the equipment be capable of heating to temperatures of about 220° F. to 300° F. and/or maintaining such temperatures to soften the polymer, and mixing the softened polymer, resin and oil components together. The resin and oil may be preheated prior to charging to further reduce processing time. Ribbon blenders are readily available from companies such as American Process Systems of Gurnee, Ill. 60031; Charles Ross & Son Company of Hauppauge, N.Y. 11788-0615; and Jaygo Incorporated of Mahwaugh, N.J. 07430.

An appropriate pump 16 is connected to vessel 10 to receive the liquid melt contents thereof and pump them to an emulsifier/dispersing unit 18. Various types of equipment may be used for element 18, it being important that it be capable of shearing and smearing the softened polymeric component of the melt and mixing it with the resin and oil components thereof. By "shear and smear" it is meant that the polymer is not only cut into small particles but it is squeezed and mechanically deformed at high speed between closely fitting surfaces in the device. A presently preferred piece of equipment for this purpose is the DISPAX-REACTOR 3-Stage Dispersing Machine available from IKA Maschinenbau Janke & Kunkel GMBH & Co., KG. C/O IKA - Works, Cincinnati, Ohio 45240, which markets the DISPAX-REACTOR models and ULTRA-TURRAX-IN-CLINE models of these machines. In a pilot operation a 7.5 HP unit, model DR3/8/6, is satisfactory, operating at about 1 gal/min for continuous batch method. For commercial production, a 50 HP unit operating at about 10 gal/min. would be useful for a continuous batch method. Alternatively, a high speed mixer of the in-line type available from Jaygo Incorporated and other suppliers may also be used for this purpose.

In practicing the preferred method of the invention, the resin and oil components are charged to vessel 10 and heated to about 300° F. or they may be preheated before charging. This temperature is not crucial but should not be so high as to create any substantial degradation of the block polymer component. It is only necessary that the temperature be adequate to soften the polymer particles. Typically polymers soften at temperatures of about 212° F.–300° F. The polymer component is added to the hot charge in vessel 10. The polymer is preferably in a bead, crumb or other granulated or particulate form. The polymer will usually soften within a matter of minutes with such heating and with agitation by blades 14, after which pump 16 is activated and the hot liquid melt mixture is supplied to the unit 18 to shear and smear the polymer. After this, the production of the adhesive is essentially completed. It then flows to a holding tank and is thereafter packaged as desired. FIG. 1 shows an arrangement for what may be thought of as a batch method.

Figure 2:
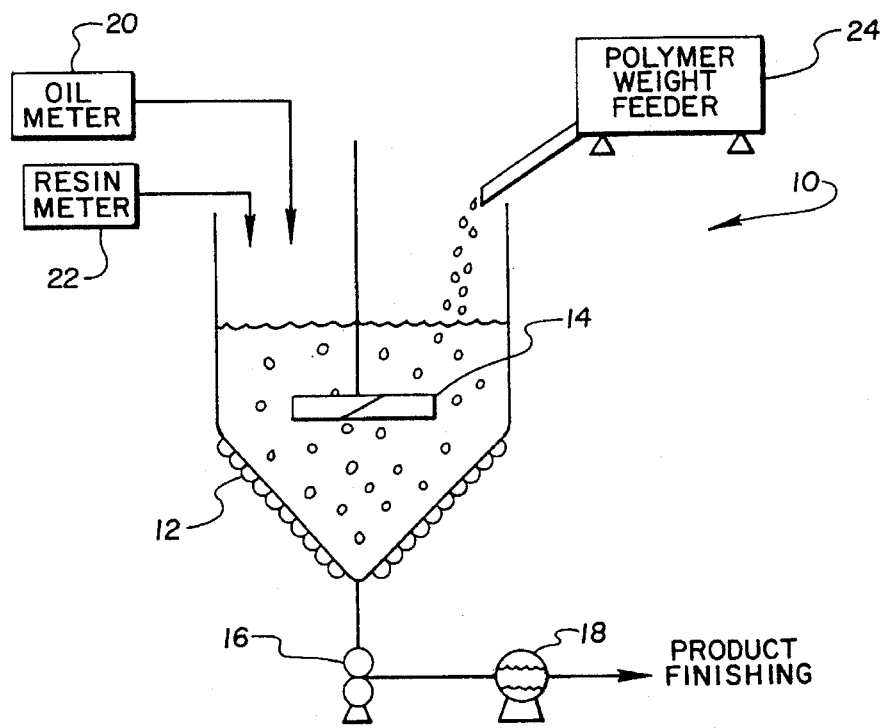
FIG. 2 is a schematic showing of the processing equipment used in a continuous form of the subject method (external emulsifier).

The method of the invention may also be practiced on a continuous basis as shown by the arrangement of FIG. 2 which is also of the "external emulsifier" type. In practicing such a form of the invention, the components are metered into vessel 10 as indicated at 20, 22 and 24. Vessel 10 is sized to provide about 2 to 30 minutes hold time to insure softening of this polymer and the uniformity of the blend. The oil and resin or other constituents are stored in liquid form in feed tanks 20 and 22. The liquids are added using positive displacement meter pumps (not shown) as are known in the art. The polymer particulate is added using a solid weight loss feeder 24 of the type also known in the art. The melt is stirred for hold times of about 10 minutes and pumped to unit 18 as before but on a continuous basis.

Figure 3:
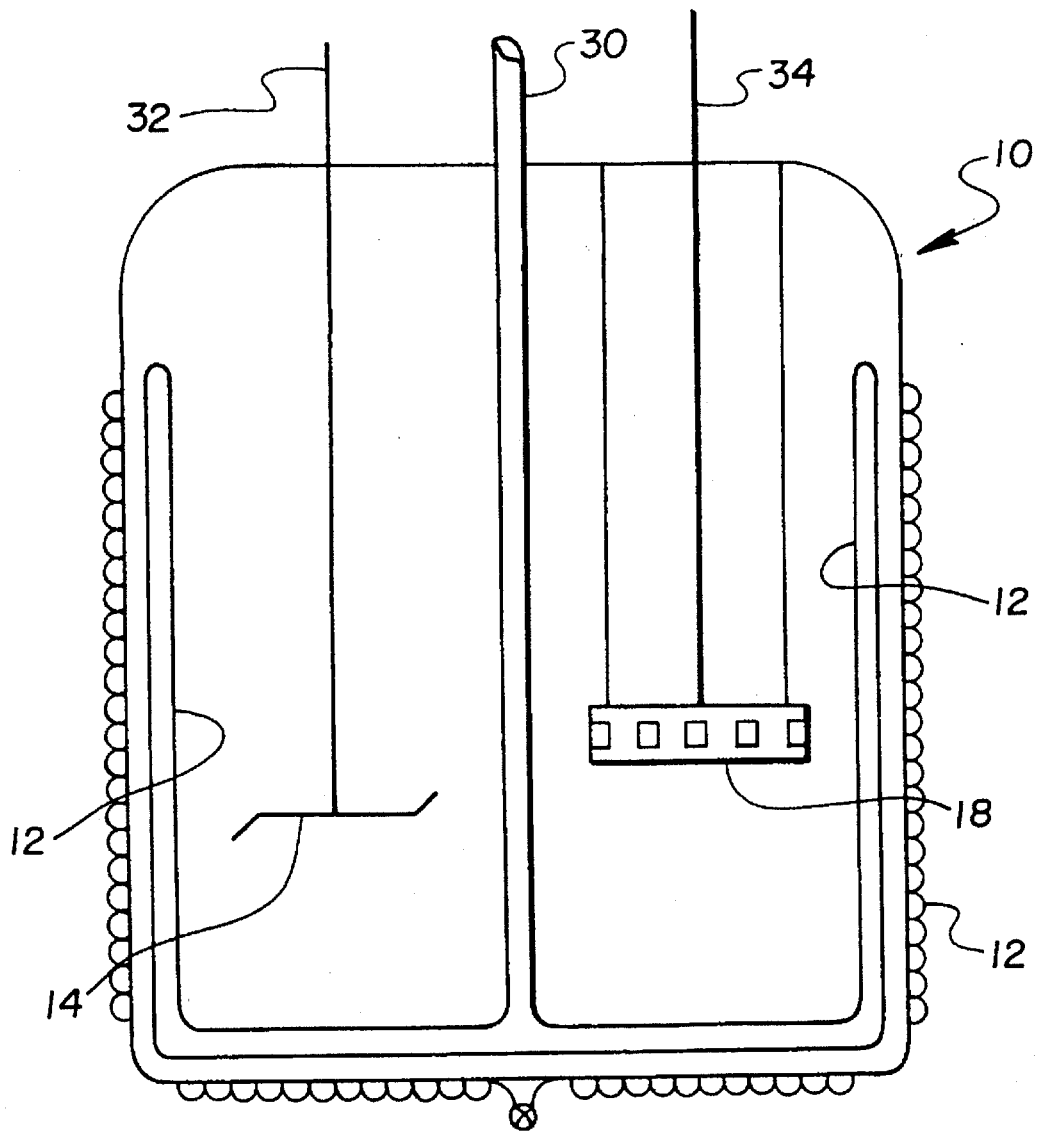
FIG. 3 is a schematic showing of the processing equipment in which the disperser or emulsifier is included within the melting tank (internal emulsifier).

Referring now to FIG. 3, an arrangement referred to as the "internal emulsifier" is shown. In such an arrangement, the unit 18 is included within tank 10 and merely causes by flowthrough the circulation of the charge within vessel 10. Vessel 10 may be a Ross- type tank having a triple shaft mixer. The center shaft 30 is a sweep agitator that turns slowly for batch turnover and wipes clean the vessel walls 10 for improved heat transfer. A second shaft 32 is a Cowles-type mixer blade. The third shaft 34 is a mixer-emulsifier head. The mixer-emulsifier head has a fitted outer slotted hub with a high speed inner hub rotor closely fitted. The rotor pumps melt material into the hub and chops and smears the softened block polymer. The tolerances are very close to actively cut the polymer. The Charles Ross & Son Company markets several models of this type tank.

EXAMPLES

Various adhesive compositions were prepared using the method as follows.

Utilizing a system as shown in FIG. 3 with internal emulsifier, a Daymax mixer with an Eastern Rotostat from EMI Incorporated of Clinton, Conn. 06413-0912, (1 HP, 1750 rpm with ¼" slotted head), oil, and resin were melted at a temperature of about 330° F. This took about 15 minutes. The Daymax agitator blades were turned on about 15 minutes and beads of block polymer were added to the melt. It was allowed to heat up and soften for about 10 minutes and then the mixer/emulsifier unit was activated until the mixture appeared to be smooth—about 30 minutes to an hour.

The method was used to prepare adhesives such as:

| PSA | |
|---|---|
| Segmented Styrene-butadiene block polymer | 14.5% |
| Linear styrene-isoprene block polymer | 6.2% |
| Zonstar 501 lite (tackifying resin) | 58.6% |
| Mineral Oil | 20.7% |
| | 100% |

| Non Tacky Block Polymer Adhesive | |
|---|---|
| Irganox 1076 (antioxidant) | 0.3% |
| Aromatic resin | 15.0% |
| Polymerized resin acid | 24.1% |
| Paraffin Wax 155F | 23.0% |
| Linear styrene-butadiene block polymer | 37.6% |
| | 100% |

Another procedure using a Ross Mixer as described above with internal emulsifier (See FIG. 3) was used as follows.

1. N₂ purge of vessel. Temperature set at 350° F.
2. Charge all oil. Begin heating and mixing.
3. Start sweep agitator.
4. Charge antioxidant.
5. Charge resin as fast as mixing will allow. Withhold 20% of resin (to be added later for temperature control).
6. When batch temperature reached 300° F., emulsifier/dispersion unit started at high speed and block polymer charged.
7. Emulsified until smooth (1 hour or less).
8. Temperature set at 275° F.
9. Charge remaining resin (resin at ambient for pulling temperature down
10. Dump into drums.

Both pressure sensitive and non-tackifying adhesives may be prepared by this method. Those adhesive compositions prepared passed all normal quality control specifications established for these adhesives as produced by prior art methods. Several PSA compositions among others which were produced according to the method of the invention and utilizing the Ross mixer as already described, for example, met product quality control specifications such as having viscosities at 300° F. of 2,450 and 7,375 Centiposes, respectively and SAFT (shear adhesion failure temperature) of 129° F.±1 and 145° F.±2. Some of these included various KRATON block polymers.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of preparing pressure sensitive adhesive compositions comprising: forming a mixture comprised of oil, resin and block polymer, subjecting the mixture to mixing in an emulsifier/disperser accompanied by shearing and smearing for mechanically deforming and dispersing the block polymer throughout the mixture at a mixing speed such as to provide a smooth mixture in about one hour or less.

2. The method of claim 1 wherein the mixture is heated before it is mixed in the emulsifier/disperser.

3. The method of claim 1 wherein the block polymer comprises polymerized styrene blocks and polymerized butadiene blocks.

4. The method according to claim 2 wherein the temperature of the liquid mixture is in the range of about 220° F. to about 300° F.

5. A method of preparing pressure sensitive adhesive compositions comprising the steps:
   a) preparing a mixture comprised of resin and oil in liquid form in a vessel;
   b) adding block polymer to the mixture;
   c) heating the mixture to soften the polymer;
   d) passing the mixture of resin, oil and block polymer through an emulsifier/disperser capable of shearing and smearing the softened polymer at high speed thereby deforming it and dispersing it throughout the liquid within about an hour or less.

6. The method of claim 5 including retaining the mixture in the vessel at a heated temperature for a time sufficient to soften the block polymer before it is passed through the emulsifier/disperser.

7. The method of claim 5 wherein the heating temperature is in the range of about 220° F. to about 300° F.

8. The method of claim 5 wherein the polymer comprises polymerized styrene blocks and polymerized butadiene blocks.

9. The method of claim 5 practiced on a continuous basis.

10. The method of claim 5 practiced on a batch basis.

11. The method of claim 5 wherein some of the total amount of resin is withheld and added after emulsifying/dispersing the block polymer and then the withheld resin is added.

12. A method of preparing pressure sensitive adhesive compositions comprising: forming a mixture comprised of oil, tackifying resin and block polymer, the block polymer comprising non-elastomeric blocks and elastomeric blocks, subjecting the mixture to mixing in an emulsifier/disperser accompanied by shearing and smearing for mechanically deforming and dispersing the block polymer throughout the mixture at a mixing speed such as to provide a smooth mixture in about one hour or less.

13. A method of preparing pressure sensitive adhesive compositions comprising the steps:
   a) preparing a mixture comprised of tackifying resin and oil in liquid form in a vessel;
   b) adding block polymer to the mixture, the block polymer comprising elastomeric blocks and non-elastomeric blocks;
   c) heating the mixture to soften the polymer;
   d) passing the mixture of resin, oil and block polymer through an emulsifier/disperser capable of shearing and smearing the softened polymer at high speed thereby deforming it and dispersing it throughout the liquid within about an hour or less.

* * * * *

UNITED STATES PATENT AND TRADEMARK OFFICE
CERTIFICATE OF CORRECTION

PATENT NO. : 5,498,646

DATED : March 12, 1996

INVENTOR(S) : Heuer et al.

It is certified that error appears in the above-identified patent and that said Letters Patent is hereby corrected as shown below:

Column 1, Line 43, delete "may"

Signed and Sealed this

Ninth Day of July, 1996

Attest:

BRUCE LEHMAN

Attesting Officer

Commissioner of Patents and Trademarks